United States Patent
Schultes et al.

(10) Patent No.: US 8,592,525 B2
(45) Date of Patent: Nov. 26, 2013

(54) COMPOSITION WITH INCREASED STRESS CRACKING RESISTANCE

(75) Inventors: Klaus Schultes, Wiesbaden (DE); Werner Hoess, Hanau (DE); Nils Mehler, Brensbach (DE)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 13/506,268

(22) Filed: Jun. 26, 2012

(65) Prior Publication Data
US 2012/0322932 A1 Dec. 20, 2012

Related U.S. Application Data

(62) Division of application No. 12/600,840, filed as application No. PCT/EP2008/054278 on Apr. 9, 2008, now Pat. No. 8,227,549.

(30) Foreign Application Priority Data

Jun. 4, 2007 (DE) .......................... 10 2007 026 200

(51) Int. Cl.
*C08L 25/02* (2006.01)
*C08L 33/02* (2006.01)
*C08L 33/04* (2006.01)
*C08L 33/14* (2006.01)
*C08L 33/18* (2006.01)
*C08L 33/20* (2006.01)
*C08L 35/02* (2006.01)

(52) U.S. Cl.
USPC ............ 525/221; 525/222; 525/238; 525/241

(58) Field of Classification Search
USPC .................................. 525/221, 222, 238, 241
See application file for complete search history.

(56) References Cited

U.S. PATENT DOCUMENTS

| | | | | |
|---|---|---|---|---|
| 8,178,624 B2 * | 5/2012 | Schultes et al. | ................ | 525/221 |
| 8,227,549 B2 * | 7/2012 | Schultes et al. | ................ | 525/221 |
| 8,268,939 B2 | 9/2012 | Ebbrecht et al. | | |
| 2007/0055017 A1 | 3/2007 | Schultes et al. | | |
| 2007/0112135 A1 | 5/2007 | Wicker et al. | | |
| 2007/0222117 A1 | 9/2007 | Hoess et al. | | |
| 2008/0132627 A1 | 6/2008 | Schultes et al. | | |
| 2010/0098907 A1 | 4/2010 | Schultes et al. | | |
| 2010/0148401 A1 * | 6/2010 | Schultes et al. | ............ | 264/328.1 |
| 2010/0167045 A1 | 7/2010 | Schultes et al. | | |
| 2010/0213636 A1 | 8/2010 | Schmidt et al. | | |
| 2011/0230610 A1 | 9/2011 | Schultes et al. | | |
| 2012/0015141 A1 | 1/2012 | Hoess et al. | | |
| 2012/0321857 A1 | 12/2012 | Schmidt et al. | | |

FOREIGN PATENT DOCUMENTS

| | | |
|---|---|---|
| JP | 58-194939 A | 11/1983 |
| JP | 2007-510008 A | 4/2007 |
| JP | 2007-510009 A | 4/2007 |

OTHER PUBLICATIONS

Japanese Office Action Issued Oct. 26, 2012 in Patent Application No. 2010-510708 (with English translation).
U.S. Appl. No. 13/824,624, filed Apr. 18, 2013, Khrenov, et al.

* cited by examiner

*Primary Examiner* — Nathan M Nutter
(74) *Attorney, Agent, or Firm* — Oblon, Spivak, McClelland, Maier & Neustadt, L.L.P.

(57) ABSTRACT

Provided is a molding composition comprising, based on the total weight of the composition, (A) 50.0% by weight to 99.5% by weight of at least one (co)polymer which is a homopolymer or copolymer of at least 80% by weight of methyl methacrylate, (B) 0.5% by weight to 50.0% by weight of at least one copolymer obtained by polymerization of a monomer, and (C) at least one low molecular weight (meth) acrylate (co)polymer having a solution viscosity in chloroform at 25° C. (ISO 1628—part 6) of less than or equal to 55 ml/g.

24 Claims, 1 Drawing Sheet

COMPOSITION WITH INCREASED STRESS CRACKING RESISTANCE

Figure 1:
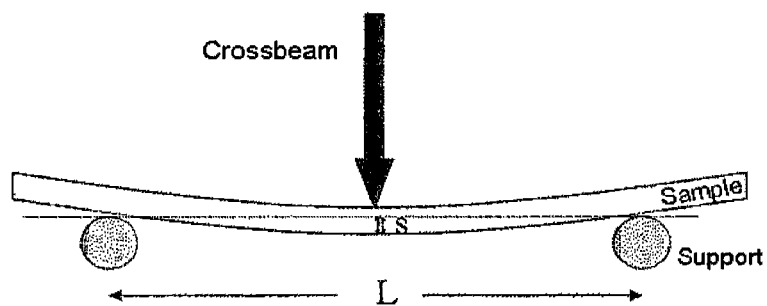

This application is a Divisional of U.S. application Ser. No. 12/600,840, filed on Nov. 19, 2009, which is a National Stage of PCT/EP08/54278, filed on Apr. 9, 2008.

The present invention relates to a composition having increased stress cracking resistance and its use.

PRIOR ART

Polymethyl methacrylate (PMMA) compositions have long been used in the automotive sector, in particular as rear light covers and instrument covers. In recent years, this material has also increasingly been used for shaped articles coloured so that they are opaque. Applications here are, inter alia, spoilers, pillar claddings, window guide strips, exterior mirrors and exterior mirror bases.

These PMMA compositions are usually processed by extrusion, coextrusion, injection moulding or multicomponent injection moulding to give mouldings for the outdoor area. In these applications, at least the uppermost layer therefore consists of PMMA. Owing to the stability to weathering and surface hardness of PMMA, said layer protects the matrices underneath.

Since the mouldings are frequently provided with a dark colouring (the PMMA layer itself or the layers underneath), they are heated to considerable extent in sunlight. High heat distortion resistance is therefore a requirement with regard to the PMMA composition so that the appropriate climatic tests of the mouldings are passed and no softening of the moulding occurs.

In addition, the mouldings must have high stress cracking resistance and high resistance to chemicals, since these applications often come into contact with cleaning agents, petrol and other aggressive agents.

Furthermore, the known properties of PMMA compositions or PMMA mouldings, such as processability and mechanical properties, must be retained.

EP 0 508 173 B1 describes the use of polymer blends comprising 55% by weight to 98% by weight of PMMA, 2% by weight to 45% by weight of a styrene-acrylonitrile copolymer (SAN) and optionally further processing auxiliaries for the production of various shaped articles. According to the description, the PMMA contains at least 80% by weight of methyl methacrylate (MMA) units. In the examples, formation of stress cracks is observed after 2.1 min to 5.5 min. However, this value is not comparable with the existing results according to the ESCR test. The Vicat softening temperature of an exemplary PMMA-SAN polymer blend is 106° C.

Similarly, EP 0 627 461 B1 discloses a weathering-resistant blend comprising 49% by weight to 99° A) by weight of PMMA and 0.95% by weight to 50% by weight of SAN and 0.05% by weight to 1% by weight of a certain stabilisation packet. Here too, PMMA contains at least 80% by weight of MMA units. In the examples, formation of stress cracks is observed after 680 s to 750 s. However, this value is not comparable with the existing results according to the ESCR test. An improvement in the heat distortion resistance is not described.

JP 03-217446 A2 relates to a blend of a copolymer of aromatic vinyl monomers and (meth)acrylic acids, PMMA and SAN. The blends have comparatively high heat distortion resistance values (114° C.). However, the transmittance of the mouldings is only 84%.

JP 02-272050 A2 describes a blend having good heat distortion resistance and impact strength, comprising
a) a copolymer of 40% by weight to 90% by weight of MMA, 5% by weight to 20% by weight of maleic anhydride, 5% by weight to 40% by weight of styrene and 1% by weight to 15% by weight of $C_{1-4}$-alkyl acrylate,
b) a copolymer of acrylonitrile and aromatic vinyl compounds or an MMA-$C_{1-4}$-alkyl acrylate copolymer,
c) an impact modifier comprising rubber grafted with acrylonitrile and an aromatic vinyl compound.

The difference between the refractive index of the mixture of components a) and b) and that of component c) should be not more than 0.005. Nevertheless, such compositions have a strong dependency of the optical properties, in particular the transparency and/or the colour impression, on the temperature.

The application WO 2005/047392A1 discloses a polymer mixture which contains the following components:
a) a low molecular weight (meth)acrylate (co)polymer, characterized by a solution viscosity in chloroform at 25° C. (ISO 1628—part 6) of less than or equal to 55 ml/g,
b) an impact modifier based on crosslinked poly(meth)acrylates,
c) a higher molecular weight (meth)acrylate (co)polymer, characterized by a solution viscosity in chloroform at 25° C. (ISO 1628—part 6) of greater than or equal to 65 ml/g and/or
d) a further (meth)acrylate (co)polymer differing from a), characterized by a solution viscosity in chloroform at 25° C. (ISO 1628—part 6) of 50 to 55 ml/g,
it being possible for the components a), b), c) and/or d), each by itself, to be understood as meaning individual polymers or mixtures of polymers, a), b), c) and/or d) summing to 100% by weight,
it being possible for the polymer mixture also to contain customary additives, auxiliaries and/or fillers. On wetting of the surface with isopropanol, a test specimen produced from the polymer mixture should have a fracture time greater than 1800 s at constant outer fibre strain of 0.39% and a fracture time greater than 700 s at constant outer fibre strain of 0.50%. However, a strong dependency of the optical properties, in particular the transparency and/or the colour impression, on the temperature is once again observable. Furthermore, in particular improved stress cracking resistance and better processability are desirable.

OBJECT AND ACHIEVEMENT

It was the object of the present invention to provide possibilities for improving the stress cracking resistance of compositions and of mouldings. At the same time, as high a heat distortion resistance as possible and as good optical properties as possible should be achieved. In particular, as small a temperature dependence of the visual appearance of the compositions and of the mouldings as possible was desired. Furthermore, mechanical properties which are as good as possible, processability which is as good as possible and long-term stability and weathering resistance which are as high as possible should be realised. It is also intended to indicate particularly expedient processes for the preparation of the novel compositions and mouldings and particularly advantageous potential uses.

This and further objects which are inevitably derived from or directly arise out of the above considerations are achieved by a composition having all the features of the present Claim 1. The subclaims relating back to this claim describe particularly expedient developments of the composition, and the further claims relate to particularly advantageous applications of the composition.

By providing a composition which contains, based in each case on its total weight, A) 50.0° A) by weight to 99.5% by weight of at least one (meth)acrylate (co)polymer and B) 0.5° A) by weight to 50.0° A) by weight of at least one copolymer obtainable by polymerisation of a monomer mixture comprising
  i. 70% by weight to 92% by weight of a vinylaromatic monomer and
  ii. 8% by weight to 30% by weight of acrylonitrile or methacrylonitrile or mixtures thereof and
  iii. 0% by weight to 22% by weight of at least one further monomer, the composition having a haze according to ASTM D1003 of less than 2.0% at 23° C. and a haze according to ASTM D1003 of less than 4.0% at 40° C. and the composition containing at least one (meth)acrylate (co)polymer a) having a solution viscosity in chloroform at 25° C. (ISO 1628—part 6) of greater than 55 ml/g, it is possible, in a manner which was not directly foreseeable, to provide a composition which is outstandingly suitable for the production of mouldings having improved stress cracking resistance. The composition can be prepared and processed in a comparatively simple manner, in particular with relatively little energy consumption, and also permits the realisation of demanding part geometries.

At the same time, the articles which can be produced from the composition are distinguished by a combination of advantageous properties:

They have very good optical properties, in particular high transparency or colour constancy, and show comparatively little dependence of the optical appearance on the temperature.

They have very high heat distortion resistance.

They exhibit outstanding mechanical properties, in particular a high modulus of elasticity and a comparatively high Vicat softening temperature.

The long-term stability and weathering resistance of the mouldings is likewise outstanding.

CARRYING OUT THE INVENTION (Meth)Acrylate (Co)Polymer A)

The invention relates to a moulding material which contains at least one (meth)acrylate (co)polymer A). The (meth)acrylate (co)polymer may be present both as individual polymer and as a mixture of a plurality of polymers.

Properties of the (Meth)Acrylate (Co)Polymer A)

The (meth)acrylate (co)polymer or (co)polymers is or are preferably chosen in the proportions and in the composition so that a test specimen produced from the (meth)acrylate (co)polymer or (co)polymers simultaneously has the following properties:
  I. a tensile modulus (ISO 527) of at least 2600 MPa, preferably at least 2750 MPa, particularly preferably at least 2850 MPa, in particular at least 3000 MPa,
  II. a Vicat softening temperature VST (ISO 306-B50) of at least 109° C., preferably at least 110° C., particularly preferably at least 112° C., in particular in the range from 110° C. to 125° C.,
  III. a tensile strength (ISO 179-2D, flatwise) of at least 17 kJ/m$^2$, preferably at least 18 kJ/m$^2$, preferably at least 20 kJ/m$^2$, particularly preferably at least 25 kJ/m$^2$, in particular at least 30 kJ/m$^2$,
  IV. a melt volume flow rate MVR (ISO 1133, 230° C./3.8 kg) of at least 1.5 cm$^3$/10 min, preferably at least 1.65 cm$^3$/10 min, particularly preferably at least 2.0 cm$^3$/10 min, in particular at least 3.0 cm$^3$/10 min.

Customary additives, auxiliaries and/or fillers are expediently chosen so that the above mentioned property profile is as far as possible not adversely affected or is at most slightly adversely affected.

Further Properties

Furthermore, the (meth)acrylate (co)polymer or (co)polymers is or are preferably present in the proportions and in the composition such that a test specimen produced from the (meth)acrylate (co)polymer or (co)polymers also has at least some of the following properties:

Intrinsic Colour

Light transmittance $T_{D65}$ according to DIN 5033/7 of at least 50%, preferably at least 55%.

Yellowness Index

The yellowness index, determinable according to DIN 6167 (illuminant D65, 10° on 3 mm layer thickness), should preferably be less than 20, preferably less than 17.

Stress Cracking Resistance (ESCR Method)

Fracture time on wetting of the surface with isopropanol and with constant outer fibre strain of
  0.39%: >1800 s
  0.50%: >700 s Surface gloss
  R(60°): >48%, preferably >50%

According to the invention, the composition is distinguished, inter alia, in that it contains at least one (meth)acrylate (co)polymer a) having a solution viscosity in chloroform at 25° C. (ISO 1628—part 6) of greater than 55 ml/g, preferably greater than or equal to 65 ml/g, in particular in the range from 68 ml/g to 75 ml/g.

This may correspond to a molecular weight $M_w$ (weight average) of 160000 g/mol (determination of $M_w$ by means of gel permeation chromatography using polymethyl methacrylate as a calibration standard). The determination of the molecular weight $M_w$ can be effected, for example, by gel permeation chromatography or by a light scattering method (cf. H. F. Mark et al., Encyclopedia of Polymer Science and Engineering, 2nd. Edition, Vol. 10, page 1 et seq., J. Wiley, 1989).

In a first very particularly preferred variant of the present invention, the (meth)acrylate (co)polymer a) is a copolymer of methyl methacrylate, styrene and maleic anhydride.

Suitable proportions may be, for example:
50% by weight to 90% by weight, preferably 70% by weight to 80% by weight, of methyl methacrylate,
10% by weight to 20% by weight, preferably 12% by weight to 18% by weight, of styrene and
5% by weight to 15% by weight, preferably 8% by weight to 12% by weight, of maleic anhydride.

Corresponding copolymers can be obtained in a manner known per se by free radical polymerisation. EP-A 264 590 describes, for example, a process for the preparation of a moulding material from a monomer mixture comprising methyl methacrylate, vinylaromatic, maleic anhydride and optionally a lower alkyl acrylate, in which the polymerisation is carried out to a conversion of 50% in the presence or absence of a nonpolymerisable organic solvent, and in which the polymerisation is continued from a conversion of at least 50% in the temperature range from 75° C. to 150° C. in the presence of an organic solvent to a conversion of at least 80% and then the low molecular weight volatile constituents are evaporated.

JP-A 60-147 417 describes a process for the preparation of a polymethacrylate moulding material having high heat distortion resistance, in which a monomer mixture comprising methyl methacrylate, maleic anhydride and at least one vinylaromatic is fed into a polymerisation reactor which is suitable for a solution or mass polymerisation, at a temperature of 100° C. to 180° C., and is polymerised. DE-A 44 40 219 describes a further preparation process.

The proportion of the (meth)acrylate (co)polymer a), based on the total weight of all (meth)acrylate (co)polymers, is preferably at least 75% by weight, preferably at least 85% by weight, particularly at least 95% by weight.

In a second very particularly preferred variant of the present invention, the (meth)acrylate (co)polymer a) is a homopolymer or copolymer of 80% by weight to 100% by weight, particularly preferably of 90% by weight—99.5% by weight, of methyl methacrylate units polymerised by a free radical method and optionally of 0% by weight—20% by weight, preferably of 0.5% by weight—10% by weight, of further comonomers which can be polymerised by a free radical method, e.g. $C_1$- to $C_4$-alkyl (meth)acrylates, in particular methyl acrylate, ethyl acrylate or butyl acrylate.

Particularly preferred copolymers are those comprising 95% by weight to 99.5% by weight of methyl methacrylate and 0.5% by weight to 5% by weight, preferably 1% by weight to 4% by weight, of methyl acrylate.

Expediently, the composition furthermore contains at least one low molecular weight (meth)acrylate (co)polymer b) having a solution viscosity in chloroform at 25° C. (ISO 1628—part 6) of less than or equal to 55 ml/g, preferably less than or equal to 50 ml/g, in particular 45 ml/g to 55 ml/g.

This may correspond to a molecular weight $M_w$ (weight average) of 95000 g/mol (determination of $M_w$ by means of gel permeation chromatography using polymethyl methacrylate as a calibration standard). The determination of the molecular weight $M_w$ can be effected, for example, by gel permeation chromatography or by a light scattering method (cf. H. F. Mark et al., Encyclopedia of Polymer Science and Engineering, 2nd. Edition, Vol. 10, page 1 et seq., J. Wiley, 1989).

The (meth)acrylate (co)polymer b) is preferably a copolymer of methyl methacrylate, styrene and maleic anhydride.

Suitable proportions may be, for example:
50% by weight to 90% by weight, preferably 70% by weight to 80% by weight, of methyl methacrylate,
10% by weight to 20% by weight, preferably 12% by weight to 18% by weight, of styrene and
5% by weight to 15% by weight, preferably 8% by weight to 12% by weight, of maleic anhydride.

Valuable information on the preparation of such copolymers can be obtained, inter alia, from EP-A 264 590, JP-A 60-147 417 and DE-A 44 40 219.

The (meth)acrylate (co)polymer b) can be prepared, for example, by adding 1.9 g of tert-butyl perneodecanoate and 0.85 g of tert-butylperoxy-3,5,5-trimethylhexanoate as a polymerisation initiator and 19.6 g of 2-mercaptoethanol as a molecular weight regulator and 4.3 g of palmitic acid to a monomer mixture comprising, for example, 6355 g of methyl methacrylate, 1271 g of styrene and 847 g of maleic anhydride. The resulting mixture can be introduced into a polymerisation chamber and degassed, for example for 10 minutes. Thereafter, polymerisation can be effected in a water bath, for example for 6 hours at 60° C. and then for 30 hours at a water bath temperature of 55° C. After about 30 hours, the polymerisation mixture reaches its maximum temperature of about 126° C. After removal of the polymerisation chamber from the water bath, the polymer is thermostated appropriately in the polymerisation chamber for about a further 7 hours, for example at 117° C. in the air in an oven.

The (meth)acrylate (co)polymers a) and b) are advantageously present in the following ratios which preferably sum to at least 75% by weight, preferably to at least 90% by weight, in particular to 100% by weight, based on the total weight of all of the (meth)acrylate (co)polymers.

(Meth)acrylate (co)polymer a): 25% by weight to 75% by weight, preferably 40 by weight to 60% by weight, in particular 45% by weight to 55% by weight, (Meth)acrylate (co)polymer b): 25% by weight to 75% by weight, preferably 40% by weight to 60% by weight, in particular 45% by weight to 55% by weight.

Copolymer B)

In addition to the (meth)acrylate (co)polymer, the moulding material according to the invention contains at least one further copolymer (SAN copolymer) B) which is obtainable by polymerisation of a monomer mixture comprising
i. 70% by weight to 92% by weight, preferably 75% by weight to 82% by weight, in particular 78% by weight to 81% by weight, of at least one vinylaromatic monomer and
ii. 8% by weight to 30% by weight, preferably 18% by weight to 25% by weight, in particular 19% by weight to 22% by weight, of acrylonitrile or methacrylonitrile or mixtures thereof,
iii. 0% by weight to 22% by weight of at least one further monomer.

Particularly suitable vinylaromatic monomers are styrene, α-methylstyrene, tert-butylstyrene, monochlorostyrene and vinyltoluene, particularly preferably styrene and α-methylstyrene.

Furthermore, SAN copolymers having a molecular weight (weight average $M_w$) of 60 000 g/mol to 300 000 g/mol, preferably of 100 000 g/mol to 200 000 g/mol, which were preferably prepared by the process described in British Patent 14 72 195, have proved to be very particularly useful. The molecular weight is determined in a manner known per se, in particular by light scattering methods.

The amount of component B), based on the total weight of the moulding material, is, according to the invention, 0.5% by weight to 50.0% by weight, preferably 20.0% by weight to 40.0% by weight.

The amounts of components A) and B) preferably sum to at least 75% by weight, preferably to at least 90% by weight, in particular to 100% by weight, based on the total weight of the composition.

The preparation of component B) is carried out as a rule by known polymerisation processes, such as mass, solution, emulsion or bead polymerisation. Such processes are described, for example, in Kunststoffhandbuch [Plastics Handbook], editors Vieweg and Daumiller, volume V; Polystyrol [Polystyrene], Carl-Hanser-Verlag, Munich 1969, page 124 et seq., and in British Patent 14 72 195.

Customary Additives, Auxiliaries and/or Fillers

The composition according to the invention may also contain customary additives, auxiliaries and/or fillers, such as, for example, heat stabilisers, UV stabilisers, UV absorbers, antioxidants, in particular soluble or insoluble dyes or colourants, provided that the properties of the composition according to the invention are not adversely affected by these additives.

UV Stabilisers and Free Radical Scavengers

Optionally present UV stabilisers are, for example, derivatives of benzophenone, the substituents of which, such as hydroxyl and/or alkoxy groups, are generally present in the 2- and/or 4-position. These include 2-hydroxy-4-n-octyloxybenzophenone, 2,4-dihydroxybenzophenone, 2,2'-dihydroxy-4-methoxybenzophenone, 2,2',4,4'-tetrahydroxybenzophenone, 2,2'-dihydroxy-4,4'-dimethoxybenzophenone, 2-hydroxy-4-methoxybenzophenone. Furthermore, substituted benzotriazoles are very suitable as an added UV stabiliser and include in particular 2-(2-hydroxy-5-methylphenyl) benzotriazole, 2-[2-hydroxy-3,5-di(alpha,alpha-dimethylbenzyl)phenyl]benzotriazole, 2-(2-hydroxy-3,5-di-tert-butylphenyl)benzotriazole, 2-(2-hydroxy-3,5-butyl-5-methylphenyl)-5-chlorobenzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-butylphenyl)benzotriazole, 2-(2-hydroxy-3-sec-butyl-5-tert-butylphenyl)benzotriazole and 2-(2-hydroxy-5-tert-octylphenyl)benzotriazole.

UV stabilisers which may furthermore be used are ethyl 2-cyano-3,3-diphenylacrylate, 2-ethoxy-2'-ethyloxalic acid bisanilide, 2-ethoxy-5-tert-butyl-2'-ethyloxalic acid bisanilide and substituted phenyl benzoates.

The UV stabilisers may be present as low molecular weight compounds, as stated above, in the polymethacrylate materials to be stabilised. However, UV-absorbing groups in the matrix polymer molecules may also be covalently bonded after copolymerisation with polymerisable UV-absorbing compounds, such as, for example, acrylic, methacrylic or allyl derivatives of benzophenone derivatives or benzotriazole derivatives.

The proportion of UV stabilisers, it also being possible for this to be mixtures of chemically different UV stabilisers, is as a rule from 0.01% by weight to 1.0% by weight, especially from 0.01% by weight to 0.5% by weight, in particular from 0.02% by weight to 0.2% by weight, based on the totality of all constituents of the polymethacrylate resin according to the invention.

Sterically hindered amines, which are known by the name HALS ((Hindered Amine Light Stabiliser) may be mentioned here as an example of free radical scavengers/UV stabilisers. They can be used for inhibiting ageing processes in finishes and plastics, especially in polyolefin plastics (Kunststoffe [Plastics], 74 (1984) 10, pages 620 to 623; Farbe+Lack [Paints+Finishes], 96$^{th}$ year, 9/1990, pages 689 to 693). The tetramethylpiperidine group present in the HALS compounds is responsible for the stabilising effect thereof. This class of compounds may be either unsubstituted or substituted by alkyl or acyl groups on the piperidine nitrogen. The sterically hindered amines do not absorb in the UV range. They trap free radicals formed, which once again the UV absorbers are incapable of doing.

Examples of HALS compounds which have a stabilising effect and can also be used as mixtures are: bis(2,2,6,6-tetramethyl-4-piperidyl)sebacate, 8-acetyl-3-dodecyl-7,7,9,9-tetramethyl-1,3-8-triazaspiro(4,5)decane-2,5-dione, bis(2,2,6,6-tetramethyl-4-piperidyl)succinate, poly(N-ß-hydroxyethyl-2,2,6,6-tetramethyl-4-hydroxypiperidine succinic acid ester) and bis(N-methyl-2,2,6,6-tetramethyl-4-piperidyl)sebacate.

The free radical scavengers/UV stabilisers are used in the compositions according to the invention in amounts of 0.01% by weight to 1.5% by weight, especially in amounts of 0.02% by weight to 1.0% by weight, in particular in amounts of 0.02% by weight to 0.5% by weight, based on the totality of all constituents.

Lubricants or Mould Release Agents

In particular, lubricants or mould release agents which can reduce or completely prevent possible adhesion of the moulding material to the injection mould are important for the injection moulding process.

Accordingly, lubricants, for example selected from the group consisting of the saturated fatty acids having less than $C_{20}$, preferably $C_{16}$ to $C_{18}$, carbon atoms or of the saturated fatty alcohols having less than $C_{20}$, preferably $C_{16}$ to $C_{18}$, carbon atoms, may be present as auxiliaries. Small proportions of not more than 0.25% by weight, e.g. 0.05% by weight to 0.2% by weight based on the moulding material, are preferably present.

For example, stearic acid, palmitic acid and industrial mixtures of stearic and palmitic acid are suitable. For example, n-hexadecanol, n-octadecanol and industrial mixtures of n-hexadecanol and n-octadecanol are furthermore suitable.

A particularly preferred lubricant or mould release agent is stearyl alcohol.

Further Additives, Auxiliaries and/or Fillers

In the context of the present invention, the addition of the components $c_1$), $c_2$), $c_3$) and/or $c_4$) has also proved very particularly useful.

The component $c_1$) designates triaryl phosphites of the general formula (I)

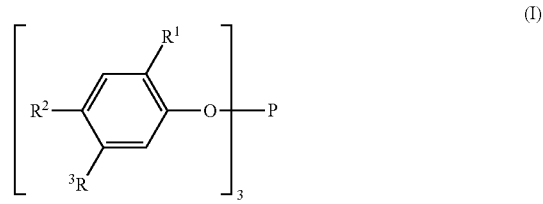

in which $R^1$ and $R^2$ represent $C_1$-$C_{12}$-alkyl, such as methyl, ethyl, propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 1-methylhexyl, 2-methylhexyl, 3-methylhexyl, 4-methylhexyl, 5-methylhexyl, 1-ethylpentyl, 2-ethylpentyl, 1-propylbutyl, octyl, nonyl, decyl, undecyl and dodecyl, preferably $C_3$-$C_{12}$-alkyl radicals branched in 1-position (a), in particular $C_3$-$C_7$-alkyl radicals, such as 1-methylethyl, 1-methylpropyl, 1,1-dimethylethyl, 1-methylbutyl, 1,2-dimethylpropyl, 1,1-dimethylpropyl, 1-ethylpropyl, 1-methylpentyl, 1,2-dimethylbutyl, 1,3-dimethylbutyl, 1,1-dimethylbutyl, 1,1,2-trimethylpropyl, 1,2,2-trimethylpropyl, 1-ethylbutyl, 1-ethyl-2-methylpropyl, 1-methylhexyl, 1-ethylpentyl and 1-propylbutyl and 1,1,3,3-tetramethylbutyl, 1,1,2,2,5,5-hexamethylhexyl, $C_5$-$C_8$-cycloalkyl, such as cyclopentyl, cyclohexyl, cycloheptyl and cyclooctyl, preferably cyclohexyl, $C_6$-$C_{10}$-aryl and $C_6$-$C_{10}$-aryl-$C_1$-$C_4$-alkyl, the aryl radicals of which may be up to trisubstituted by $C_1$-$C_4$-alkyl, such as phenyl, naphthyl or 2,2-dimethylbenzyl, and $R^3$ denotes hydrogen and $C_1$-$C_4$-alkyl, such as methyl, ethyl, n-propyl, isopropyl, n-butyl, isobutyl, sec-butyl and tert-butyl, preferably hydrogen and methyl.

Examples of compounds (I) which are particularly important with regard to the present invention are the commercially available tris(2,4-di-tert-butylphenyl) phosphite (Irgafos™ 168, Ciby-Geigy) and tris(nonylphenyl)phosphite, preferably tris(2,4-di-tert-butylphenyl)phosphite.

The component $c_2$) designates an amine of the general formula (II)

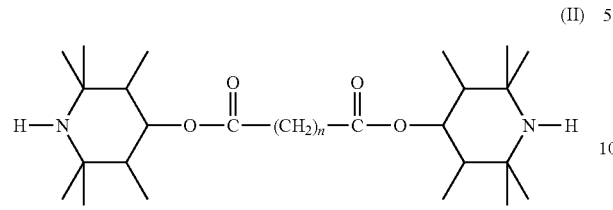

in which n represents the values 2 to 10, preferably 2 to 8. Compounds of this type are also known by the designation HALS (hindered amine light stabilisers) compounds and are commercially available.

An example of compounds (II) which are particularly important with regard to the present invention is bis(2,2,6,6-tetramethyl-4-piperidyl) sebacate (commercially available by the name Tinuvin™ 770 DF (Ciba Geigy)).

The component $c_3$) designates a benzotriazole of the general formula (III)

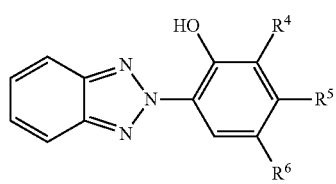

in which $R^4$, $R^5$ and $R^6$ have the meaning of $R^1$.

Examples of compounds (III) which are particularly important with regard to the present invention are 2-(2'-hydroxy-5'-methyl-phenyl)benzotriazole (commercially available by the name Tinuvin™ P (Ciba Geigy)) or 2-(2'-hydroxy-3'-dodecyl-5'-methyl-decyl)benzotriazole.

The component $c_4$) designates a phenol of the general formula (IV)

$$AB_k \qquad (IV)$$

in which k denotes 1, 2 or 4 and, if k is 1, A represents —COOR$^7$, —CONHR$^7$,

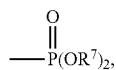

$R^7$ denoting $C_1$-$C_{21}$-alkyl and,
if k is 2, A representing —CONH—(CH$_2$)$_n$—CONH—,

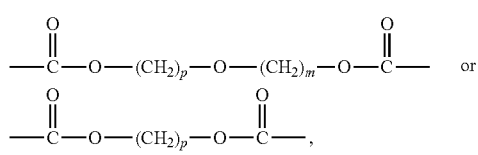  or in which p and m denote integers from 1 to 10 and, if k is 4, A represents

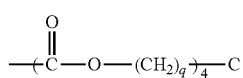

in which q denotes an integer from 1 to 4, and
B represents

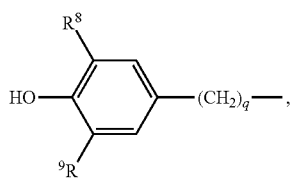

in which $R^8$ and $R^9$ represent hydrogen, methyl or tert-butyl.

The addition of the component $c_4$) may in some cases lead to a further improvement of the stress cracking resistance after weathering.

Examples of compounds (IV), which are particularly important with regard to the present invention, are octadecyl 3-(3,5-di-tert-butyl-4-hydroxyphenyl)propionate (commercially available by the name Irganox™ 1076 (Ciba Geigy)) and

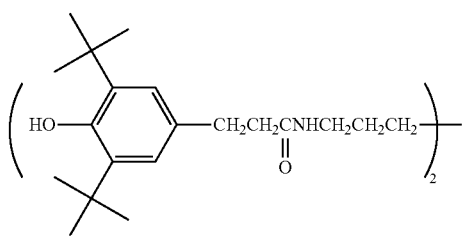

IRAGANOX 1098

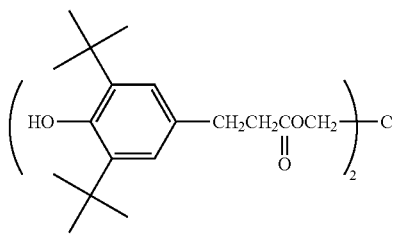

IRAGANOX 1010

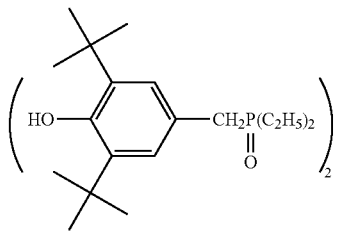

IRAGANOX 1222

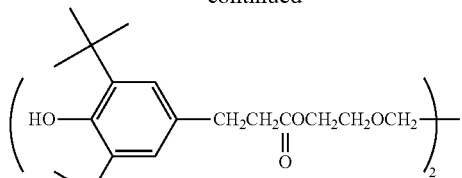

IRAGANOX 245

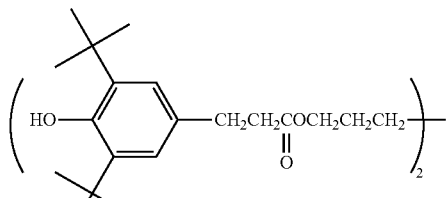

IRAGANOX 259

The components $c_1$), $c_2$) and $c_3$) are preferably used as a mixture in order to achieve a synergistic effect with regard to the improvement of the stress cracking resistance after weathering.

The preferred amounts of the components $c_1$) to $c_3$) are in each case in the range from 1% by weight to 50% by weight, preferably from 30% by weight to 50% by weight, based on the sum of the amounts of the components $c_1$) to $c_3$), the individual amounts summing to 100.

The amount of the component $c_4$) is preferably chosen in the range from 0% by weight to 25% by weight, preferably in the range from 10% by weight to 25% by weight, based on the total amount of the components $c_1$) to $c_3$).

The total amount of the components $c_1$) to $c_4$), based on the total weight of the composition, is advantageously 0.05% by weight to 1% by weight, preferably 0.1% by weight to 0.5% by weight.

Opacity (Haze) of the Composition

According to the invention, the composition is characterized in that it has a haze according to ASTM D1003 of less than 2.0%, preferably less than 1.5%, in particular less than 1.2%, at 23° C. and a haze according to ASTM D1003 of less than 4.0%, preferably less than 3.5%, in particular less than 3.0%, at 40° C. The haze according to ASTM D1003 at 60° C. is expediently less than 6.0%, preferably less than 5.5%, in particular less than 5.0%.

The addition of additives, such as, for example, impact modifiers, having substantially different thermal behaviour of the refractive indices compared with the polymer matrix, should therefore as far as possible be avoided since otherwise a significant temperature dependence of the optical appearance is observable.

Transparency of the Composition

Furthermore, the composition preferably has a light transmittance $T_{D65}$ according to DIN 5033/7 greater than 80%, preferably greater than 83%, in particular greater than 85%, both at 23° C. and at 40° C.

Melt Volume Flow Rate MVR of the Moulding Material

In the present invention, the composition preferably has a melt volume flow rate MVR measured according to ISO 1133 at 230° C. and 3.8 kg, of greater than 1.2 cm³/10 min, preferably of greater than 1.5 cm³/10 min, in particular in the range from 1.7 cm³/10 min to 4.0 cm³/10 min.

Preparation of the Composition

The composition can be prepared by dry blending of the components, which may be present as powder, particles or preferably granules The composition can also be processed by melting and mixing the individual components in the molten state or by melting dry premixes of the individual components to give a ready-to-use moulding material. This can be effected, for example, in single-screw or twin-screw extruders. The extrudate obtained can then be granulated. Customary additives, auxiliaries and/or fillers can be directly admixed or added later by end users as required.

Processing to Give Mouldings

The composition according to the invention is suitable as a starting material for the production of mouldings having improved resistance to chemicals and stress cracking resistance. The forming of the composition can be effected by methods known per se, for example by processing via the elastoviscous state, i.e. by kneading, rolling, calendering, extrusion or injection moulding, extrusion and injection moulding, in particular injection moulding, being particularly preferred here.

The injection moulding of the composition can be effected in a manner known per se at temperatures in the range of 220° C.-260° C. (melt temperature) and a mould temperature of preferably 60° C. to 90° C.

The extrusion is preferably carried out at a temperature of 220° C. to 260° C.

Mouldings

The mouldings obtainable in this manner are distinguished in that they have a haze according to ASTM D1003 of less than 2.0%, preferably less than 1.5%, in particular less than 1.2%, at 23° C. and a haze according to ASTM D1003 of less than 4.0%, preferably less than 3.5%, in particular less than 3.0%, at 40° C. The haze according to ASTM D1003 at 60° C. is expediently less than 6.0%, preferably less than 5.5%, in particular less than 5.0%.

Furthermore, the mouldings preferably show a light transmittance, $T_{D65}$ according to DIN 5033/7 in the range of 40% to 93%, in particular in the range of 70% to 92%.

The yellowness index of the mouldings, determinable according to DIN 6167 (illuminant D65, 10° on 3 mm layer thickness) should preferably be less than 6, preferably less than 7.

The Vicat softening temperature of the mouldings according to ISO 306-B50 is advantageously at least 109° C., preferably at least 112° C.

The nominal elongation at break of the mouldings according to ISO 527 should preferably be at least 3.0%, particularly preferably 3.2%.

The modulus of elasticity of the mouldings according to ISO 527 is advantageously greater than 3200 MPa, preferably 3500 MPa.

Furthermore, particularly suitable mouldings have a normalised stress cracking resistance factor greater than 0.80 in the stress cracking resistance test according to the ESCR method at an outer fibre strain of 1% after 30 minutes.

Uses

The mouldings according to the invention can be used in particular as a covering, finish or film. Injection mouldings can be used as parts of household appliances, communication devices, hobby or sports devices, bodywork parts or parts of bodywork parts in automotive, ship or aircraft construction.

Typical examples of bodywork parts or parts of bodywork parts of automobiles are, for example, spoilers, claddings, roof modules or exterior mirror housings.

EXAMPLES

The invention is explained in more detail below by examples, without it being intended to limit the concept of the invention thereby.

The following components a1), a2), b) and/or c) were used for the polymer matrix.

The following was used as component a1): a commercially available copolymer of 75% by weight of methyl methacrylate, 15% by weight of styrene and 10% by weight of maleic anhydride, having a solution viscosity number according to ISO 1628-6 at 25° C. in chloroform of 68 ml/g.

The following was used as component (a2): a commercially available copolymer of 99% by weight of methyl methacrylate and 1% by weight of methyl acrylate, having a solution viscosity in chloroform at 25° C. (ISO 1628—part 6) of about 72 ml/g.

Preparation of Component b):

1.9 g of tert-butyl perneodecanoate and 0.85 g of tert-butyl peroxy-3,5,5-trimethylhexanoate as a polymerisation initiator and 19.6 g of 2-mercaptoethanol as a molecular weight regulator and 4.3 g of palmitic acid are added to a monomer mixture comprising 6355 g of methyl methacrylate, 1271 g of styrene and 847 g of maleic anhydride.

The resulting mixture is introduced into a polymerisation chamber and degassed for 10 minutes. Thereafter, polymerisation is effected in a water bath for 6 hours at 60° C. and then for 30 hours at a water bath temperature of 55° C. After about 30 hours the polymerisation mixture reaches its maximum temperature of 126° C. After removal of the polymerisation chamber from the water bath, the polymer is thermostated in the polymerisation chamber for a further 7 hours at 117° C. in air in an oven.

The resulting copolymer is clear and virtually colourless and has a V.N. (solution viscosity number according to ISO 1628-6, 25° C., chloroform) of 48.7 ml/g. The flowability of the copolymer was determined according to ISO 1133 at 230° C. and 3.8 kg with MVR=3.27 cm³/10 min.

The component b) is thus a copolymer of 75% by weight of methyl methacrylate, 15% by weight of styrene and 10% by weight of maleic anhydride.

The following was used as component c): a commercially available copolymer of 99% by weight of methyl methacrylate and 1% by weight of methyl acrylate, having a solution viscosity in chloroform at 25° C. (ISO 1628—part 6) of about 53 ml/g.

®TYRIL 905UV from Dow Plastics was used as the SAN copolymer.

A dry blend was prepared from the individual components by means of a tumbling mixer and was then compounded on a Leistritz LSM 30/34 twin-screw extruder.

The compositions of the individual examples are documented in Table 1.

TABLE 1

|  | Polymer matrix [% by weight] | ®TYRIL 905UV [% by weight] |
|---|---|---|
| Example B1 | Component a1) (70) | 30 |
| Comparative example VB1 | Component a1) (100) |  |
| Example B2 | Component a2) (35) Component b) (35) | 30 |
| Comparative example VB2 | Component b) (50) Component c) (50) |  |
| Comparative example VB3 | Component b) (35) Component c) (35) | 30 |

The melt volume flow rate MVR (test standard ISO 1133: 1997) was determined.

On an injection moulding machine Battenfeld BA 350 CD, tensile test bars and injection moulded discs were produced from all materials and tested with regard to their properties by the following methods:

| | |
|---|---|
| Vicat (16 h/80° C.): | Determination of the Vicat softening temperature (test standard DIN ISO 306: August 1994) |
| Modulus of elasticity: | Determination of the modulus of elasticity (test standard: ISO 527-2) |
| Tensile strength: | Determination of the elongation at break (test standard: ISO 527) |
| Light transmittance $T_{D65}$ | according to DIN 5033/7, 23° C. |
| Yellowness index: | according to DIN 6167 (illuminant D65, 10° on 3 mm layer thickness, 23° C.) |
| Haze: | according to ASTM D1003 |

Stress Crack Formation (ESCR):

Before the test, all samples were stored for at least 24 h at 23° C./50% relative humidity.

In the ESCR test according to Prof. Bledzki (A. Bledzki, C. Barth, Materialprufung [Material Testing] 40, 10 (1998)), an outer fibre strain which was constant as a function of time was applied by means of a three-point bending arrangement. The test specimen (dimensions 80 mm×20 mm×d, thickness d=4 mm) rested flat on two supports with a spacing L of 64 mm.

Figure 2:
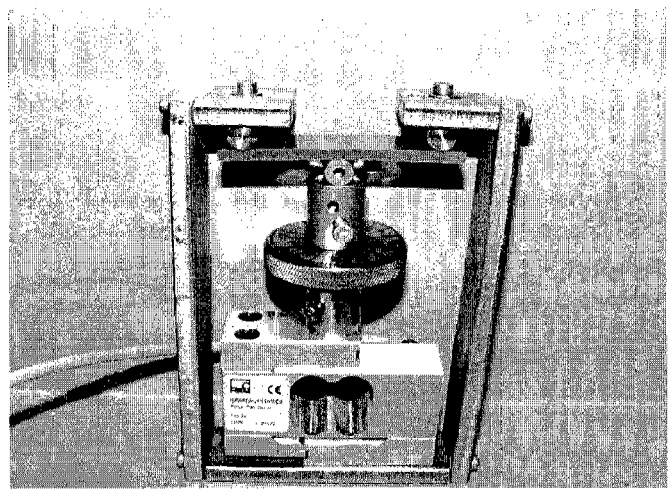

The specific experimental setup is illustrated in FIGS. 1 and 2. FIG. 1 schematically shows the three-point bending arrangement in the ESCR test. FIG. 2 shows an ESCR test apparatus (the arrangement from FIG. 1 is upside down here). The cylindrical supports and the crossbeam have a radius of 10 mm.

The necessary sag s at a given outer fibre strain £ (in the middle of the test specimen on the side opposite the crossbeam) was calculated as in ISO 178 according to:

$$\varepsilon = \frac{6sd}{L^2} \qquad (1)$$

The sag s was adjusted by means of a knurled screw. ε was adjusted to a value of 1%. After approaching the outer fibre strain ($T_0$), a hold time of 2 min was allowed in order to await the first relaxation phenomena. At $T=T_1=2$ min, the filter paper already placed on top beforehand in the middle and having the dimensions 50×10 mm² was wetted with the medium (isopropanol). The force which was required for maintaining the outer fibre strain was measured from $T_1$ as a function of time. The filter paper was kept constantly moist with the medium in the course of the measurement. The measurement was terminated on breaking of the test specimen (force=0) but after 30 min at the latest.

This process was repeated for three test specimens. For comparison, the force curve was also recorded for a test specimen which was exposed to the same outer fibre strain but no medium. In the case of the samples without influence of the medium, the measured force value decreased slowly whilst the samples which are tested on the influence of the medium showed a faster decrease in force depending on resistance.

The time-dependent measure of the stress cracking resistance $E_T^{norm}$ is obtained in this experiment from the ratio of the forces $F_T^{mM}$ required for maintaining the outer fibre strain and $F_T^{oM}$ without influence of the medium:

$$E_T^{norm} = \frac{F_T^{mM} \cdot F_{T1}^{oM}}{F_{T1}^{mM} \cdot F_T^{oM}} \quad (2)$$

Here, the forces are additionally based on their value at $T_1$ so that at time $T_1$: $E_T^{norm}=1$. Three curves are a result in the diagram, for each test specimen with influence of the medium. The reference in each case is the same measurement for the test specimen without the influence of the medium. Normalised ESCR factors close to 1 characterize good ESC resistance, and sharply decreasing values at $E_T^{norm}$ over time T characterize poor resistance. Results of the tests on the mixtures and the corresponding shaped articles are shown in Table 2.

TABLE 2

|  | B1 | VB1 | B2 | VB2 | VB3 |
|---|---|---|---|---|---|
| Vicat [° C.] | 115.5 | 119 | 113.2 | 115 | 110.3 |
| MVR [ml/10 min] | 1.9 | 1.9 | 2.9 | 4.5 | 5.2 |
| ESCR [min] | No break - continuous decrease 0.92 at 30 min | >40 | No break - continuous decrease 0.85 at 30 min | 0.08-0.42 | 2.6-3.9 |
| Modulus of elasticity [MPa] |  | 3600 |  | 3702 | 3500 |
| Elongation at break [%] |  | 3.5 |  | 3.4 | 3.1 |
| $T_{D65}$ [%] |  | 90 |  | 89.4 | 91 |
| Yellowness index [ ] |  | −0.4 |  | 5.49 | 0.08 |
| Haze [%] |  | 1.61 |  | 0.61 | 0.54 |

The invention claimed is:

1. A molding composition comprising, based on the total weight of the composition:
    A) 50.0% by weight to 99.5% by weight of at least one (co)polymer which is a homopolymer or copolymer of at least 80% by weight of methyl methacrylate and optionally up to 20% by weight of further monomers copolymerizable with methyl methacrylate,
    B) 0.5% by weight to 50.0% by weight of at least one copolymer obtained by polymerization of a monomer mixture comprising:
        I 70% by weight to 92% by weight of a vinylaromatic monomer, and
        Ii 8% by weight to 30% by weight of acrylonitrile or methacrylonitrile or mixtures thereof, and
        Iii 0% by weight to 22% by weight of at least one additional monomer, and
    C) at least one low molecular weight (meth)acrylate (co)polymer having a solution viscosity in chloroform at 25° C. (ISO 1628—part 6) of less than or equal to 55 ml/g,
wherein
    the composition has a haze according to ASTM D1003 of less than 2.0% at 23° C. and a haze according to ASTM D1003 of less than 4.0% at 40° C.,
    the composition comprises at least one copolymer A) having a solution viscosity in chloroform at 25° C. (ISO 1628—part 6) of greater than 55 ml/g, and
    a molding obtained from the composition has a Vicat-Softening Temperature measured according to ISO 306-B50 of at least 109° C.

2. The composition of claim 1, wherein the (co)polymer A) has a solution viscosity in chloroform at 25° C. (ISO 1628—part 6) of greater than or equal to 65 ml/g.

3. The composition of claim 1, wherein the copolymer B) is obtainable by polymerization of a monomer mixture comprising:
    I 75% by weight to 92% by weight of a vinylaromatic monomer and
    Ii 8% by weight to 25% by weight of acrylonitrile or methacrylonitrile or mixtures thereof.

4. The composition of claim 1, wherein the (co)polymer A) is a copolymer of methyl methacrylate, styrene and maleic anhydride.

5. The composition of claim 4, wherein the (co)polymer A) is a copolymer of:
    50% by weight to 90% by weight of methyl methacrylate,
    10% by weight to 20% by weight of styrene, and
    5% by weight to 15% by weight of maleic anhydride.

6. The composition of claim 4, which comprises the acrylate (co)polymer A) in an amount of at least 75% by weight, based on the total weight of all (meth)acrylate (co)polymers.

7. The composition of claim 1, wherein the (co)polymer A) is a copolymer of 95% by weight to 99.5% by weight of methyl methacrylate and 0.5% by weight to 5% by weight of methyl acrylate.

8. The composition of claim 1, wherein the (meth)acrylate (co)polymer C) is a copolymer of methyl methacrylate, styrene and maleic anhydride.

9. The composition of claim 8, wherein the (meth)acrylate (co)polymer C) is a copolymer of:
    50% by weight to 90% by weight of methyl methacrylate,
    10% by weight to 20% by weight of styrene, and
    5% by weight to 15% by weight of maleic anhydride.

10. The composition of claim 1, wherein the (co)polymer A) and the (meth)acrylate (co)polymer C) are present in the following ratios, based on the total weight of the (meth)acrylate (co)polymers:
    A) 25% by weight to 75% by weight
    C) 25% by weight to 75% by weight.

11. The composition of claim 1, further comprising at least one lubricant as an auxiliary.

12. The composition of claim 11, comprising stearyl alcohol as a mold release agent.

13. The composition of claim 1, wherein the composition has a melt volume flow rate MVR, measured according to ISO 1133 at 230° C. and 3.8 kg, of greater than 1.2 cm$^3$/10 min.

14. The composition of claim 1, which is in the form of granules.

15. The composition of claim 1, which has a light transmittance TD65 according to DIN 5033/7 greater than 80% both at 23° C. and at 40° C.

16. The composition of claim 1, which has a haze according to ASTM D1003 of less than 3.0% at 40° C.

17. The composition of claim 1, which has a haze according to ASTM D1003 of less than 6.0% at 60° C.

18. The composition of claim 1, wherein a molding obtained from the composition has a Vicat-Softening Temperature measured according to ISO 306-B50 of at least 112° C.

19. A process for producing a molding, comprising forming a molding from a molding composition comprising, based on the total weight of the composition:
   A) 50.0% by weight to 99.5% by weight of at least one (co)polymer which is a homopolymer or copolymer of at least 80% by weight of methyl methacrylate and optionally up to 20% by weight of further monomers copolymerizable with methyl methacrylate,
   B) 0.5% by weight to 50.0% by weight of at least one copolymer obtained by polymerization of a monomer mixture comprising:
      I 70% by weight to 92% by weight of a vinylaromatic monomer, and
      Ii 8% by weight to 30% by weight of acrylonitrile or methacrylonitrile or mixtures thereof, and
      Iii 0% by weight to 22% by weight of at least one additional monomer, and
   C) at least one low molecular weight (meth)acrylate (co)polymer having a solution viscosity in chloroform at 25° C. (ISO 1628—part 6) of less than or equal to 55 ml/g, wherein
      the composition has a haze according to ASTM D1003 of less than 2.0% at 23° C. and a haze according to ASTM D1003 of less than 4.0% at 40° C.,
      the composition comprises at least one copolymer A) having a solution viscosity in chloroform at 25° C. (ISO 1628—part 6) of greater than 55 ml/g, and
      a molding obtained from the composition has a Vicat-Softening Temperature measured according to ISO 306-B50 of at least 109° C.

20. The process of claim 19, wherein the composition is extruded or injection molded.

21. A molding produced by a process comprising forming a molding from a molding composition comprising, based on the total weight of the composition:
   A) 50.0% by weight to 99.5% by weight of at least one (co)polymer which is a homopolymer or copolymer of at least 80% by weight of methyl methacrylate and optionally up to 20% by weight of further monomers copolymerizable with methyl methacrylate,
   B) 0.5% by weight to 50.0% by weight of at least one copolymer obtained by polymerization of a monomer mixture comprising:
      I 70% by weight to 92% by weight of a vinylaromatic monomer, and
      Ii 8% by weight to 30% by weight of acrylonitrile or methacrylonitrile or mixtures thereof, and
      Iii 0% by weight to 22% by weight of at least one additional monomer, and
   C) at least one low molecular weight (meth)acrylate (co)polymer having a solution viscosity in chloroform at 25° C. (ISO 1628—part 6) of less than or equal to 55 ml/g, wherein
      the composition has a haze according to ASTM D1003 of less than 2.0% at 23° C. and a haze according to ASTM D1003 of less than 4.0% at 40° C.,
      the composition comprises at least one copolymer A) having a solution viscosity in chloroform at 25° C. (ISO 1628—part 6) of greater than 55 ml/g, and
      a molding obtained from the composition has a Vicat-Softening Temperature measured according to ISO 306-B50 of at least 109° C.

22. The molding of claim 21, which has a light transmittance TD65 according to DIN 5033/7 in the range of 40% to 93% and a yellowness index according to DIN 6167 of less than 6.

23. The molding of claim 21, which has at least one of the following properties:
   (a) a Vicat softening temperature according to ISO 306-B50 of at least 109° C.,
   (b) a nominal elongation at break according to ISO 527 of at least 3.0%, and
   (c) a modulus of elasticity according to ISO 527 of greater than 3200 MPa.

24. The molding of claim 21, which has a normalized stress cracking resistance factor greater than 0.80 in the stress cracking resistance test according to the ESCR method after 30 minutes at an outer fiber strain of 1%.

* * * * *